Patented May 1, 1934

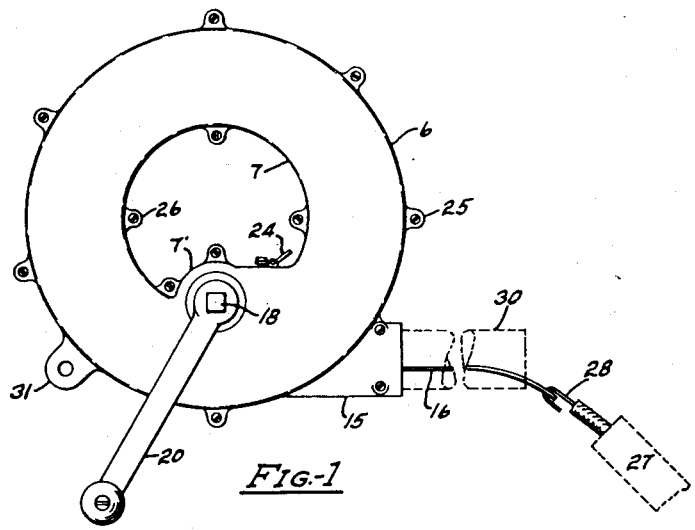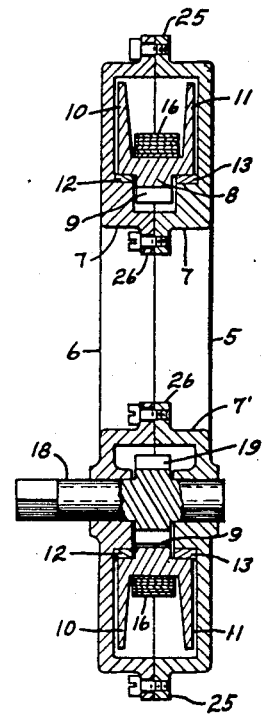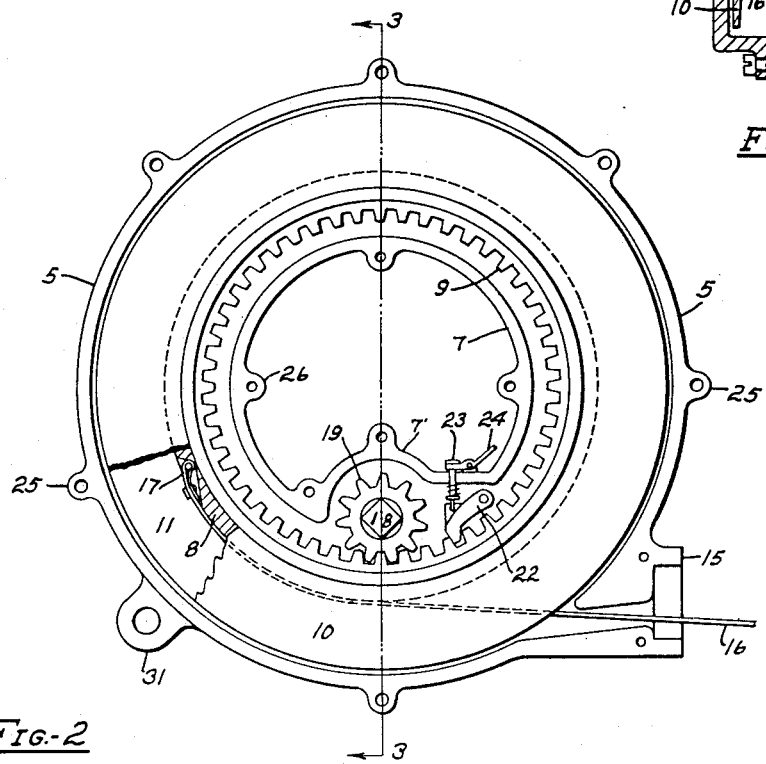

1,956,806

UNITED STATES PATENT OFFICE 1,956,806

WINCH

Frank Mitzen and Frank J. Hoffman, Racine, Wis.

Application July 17, 1933, Serial No. 680,738

4 Claims. (Cl. 242—77)

Our invention relates to an improved winch particularly adapted for use in pulling wires through conduits whereby the installation of wiring in buildings and otherwise is simplified, as well as for other purposes, and which device is of a portable character convenient to handle and to be moved from place to place as desired as will hereinafter more fully appear.

In the accompanying drawing, forming part hereof, Figure 1 is an elevation of the complete device; Fig. 2 an elevation with one side of the casing removed to show the interior mechanism; and Fig. 3 is a detail section taken on the dotted line 3—3 in Fig. 2.

In said drawing the numeral 5 indicates one portion or the left side of the casing, and 6 the right side thereof, the portions 5 and 6 having frame members 7 forming a part thereof and about which frame we position a reel having a rim 8, internal gear teeth 9, and flanges 10, 11, the flanges being offset to receive bronze or other bearing rings 12, 13, between them and the casing 5, 6. The casing members terminate in semi-cylindrical form, as 15, and when assembled constitute a guide for a metal tape or cable 16 attached, at 17, to the reel rim 8 for a purpose to appear. The frame 7 embodies an inset portion 7' forming a housing between it and the reel teeth 9 through which a shaft 18 extends and projects beyond the casing 6, said shaft having integrally formed therewith or mounted thereon a pinion 19 meshing with teeth 9, and at its outer end said shaft is provided with a suitable handle 20 for manually actuating the same. A pawl 22 is pivotally mounted in the casings and is connected to a spring-mounted lift-pin 23 passing through the frame portion 7' and also connected to a lever 24 secured to said frame portion. The reel and parts associated therewith as thus described are enclosed by affixing the casing 6 to the section 5 by securing the loops 25, 26, thereof together as indicated in Fig. 1 and then attaching handle 20 to the shaft 18.

In practice we employ a metal tape 16 (or cable) of considerable length, one hundred feet or more, wound about the reel 8, and upon depressing the lever 24 to withdraw pawl 22 from the reel teeth 9 the tape is gradually fed into a conduit 27 until its free end passes entirely through the conduit when such end may be attached to a wire 28, and the rotation of the reel reversed by operating handle 20, which winds the tape about said reel and at the same time pulls the wire 28 through the conduit 27 as indicated in Fig. 1 to be connected to other devices as desired, the rotation of the reel being controlled by the pawl 22 when lever 24 has been released. Under conditions where space is limited to prevent convenient application of the winch we insert a short tube 30 in the tape guide 15, as indicated in dotted lines in Fig. 1, so that the tape may be effectively projected when the winch is positioned a considerable distance from the conduit.

The device primarily is for pulling wires through a conduit but may be employed for tightening fence and other wires, and for other uses, for which purposes the casing includes an ear 31 adapted to be secured to a post or other support when the reel and tape may be actuated in the manner described.

We claim as our invention:

1. In a device of the class described, a casing, a frame forming part of the casing, a reel embodying a peripheral groove and internal teeth encircling the frame, flexible means secured to the reel and seated in its groove to be wound and unwound thereabout, means between the frame and reel and engaging the reel teeth for rotating the reel to retract the flexible means, and means in the frame engaging the reel teeth for controlling rotation of the reel.

2. In a device of the class described, a casing, a frame forming part of the casing, a reel embodying a peripheral groove and internal teeth encircling the frame, a tape secured to the reel and seated in its groove to be wound and unwound thereabout, a pinion in the casing between its frame and the reel for rotating the reel, a pawl engageable with the reel teeth, and a lifting device connected to the pawl and to the frame for engaging and disengaging the pawl in relation to the reel.

3. In a device of the class described, a casing including a frame, an internally toothed peripherally flanged reel positioned on the frame, a bearing ring between the frame and the reel, a shaft having a pinion thereon mounted between the frame and reel and engaging and driving the reel, a tape secured to the reel to be wound and unwound between its flanges, and means for actuating the shaft to rotate the pinion and reel.

4. In a device of the class described, a casing, a frame forming part of the casing and having an inset portion, a reel encircling the frame, a tape secured to the reel to be wound and unwound thereby, means between the reel and its portion of the frame for actuating the reel, a pawl in the casing engageable with the reel, and means for actuating the pawl for controlling the rotation of the reel.

FRANK MITZEN.
FRANK J. HOFFMAN.